(12) United States Patent
Thudt (10) Patent No.: US 7,925,798 B2
(45) Date of Patent: Apr. 12, 2011

(54) DATA PACKET PROCESSING DEVICE (75) Inventor: Raimar Thudt, Müchen (DE)

(73) Assignee: Lantiq Deutschland GmbH, Neubiberg (DE)

( * ) Notice: Subject to any disclaimer, the term of this patent is extended or adjusted under 35 U.S.C. 154(b) by 371 days.

(21) Appl. No.: 11/698,670

(22) Filed: Jan. 26, 2007

(65) Prior Publication Data

US 2008/0183907 A1    Jul. 31, 2008

(51) Int. Cl.
G06F 3/00    (2006.01)
(52) U.S. Cl. ............... 710/20; 710/29; 710/31; 710/33; 710/52; 710/53; 710/56
(58) Field of Classification Search .............. 710/20, 710/29, 31, 33, 52, 53, 56
See application file for complete search history.

(56) References Cited

U.S. PATENT DOCUMENTS

| | | | |
|---|---|---|---|
| 7,418,568 B2* | 8/2008 | Maly | 711/171 |
| 2004/0141650 A1* | 7/2004 | Hansson et al. | 382/232 |
| 2005/0021874 A1* | 1/2005 | Georgiou et al. | 709/250 |
| 2005/0025140 A1* | 2/2005 | Deforche et al. | 370/363 |
| 2006/0149915 A1 | 7/2006 | Maly | |
| 2007/0030899 A1* | 2/2007 | Iguchi et al. | 375/240.12 |
| 2007/0060142 A1* | 3/2007 | Reznik et al. | 455/445 |
| 2009/0043972 A1* | 2/2009 | Kamiko et al. | 711/154 |

FOREIGN PATENT DOCUMENTS

WO    2006080897 A1    8/2006

* cited by examiner

*Primary Examiner* — Tariq Hafiz
*Assistant Examiner* — Jasjit S Vidwan
(74) *Attorney, Agent, or Firm* — Dicke, Billig & Czaja, PLLC (57) ABSTRACT

A device for data packet processing is disclosed. In one embodiment, the device includes a processor implemented on a chip, an on-chip internal segment memory accessible by the processor, an off-chip external segment memory and a data transfer channel between the internal segment memory and the external segment memory. The external segment memory comprises first and second memory segments wherein the first and second memory segments are different in size.

16 Claims, 5 Drawing Sheets

DATA PACKET PROCESSING DEVICE

BACKGROUND

The invention relates to communication devices, and more particularly to data processing devices containing a processor used in packet-switched communications network.

In packet-switched communication systems data is transferred between system units by packets, also termed PDUs (Protocol Data Units). In some of the system units, the PDUs are subjected to protocol processing. In these system units, it is necessary to store PDUs temporarily before, during or after protocol processing.

In conventional systems, an internal (i.e. "on-chip") small memory and an external (i.e. "off-chip") large memory is used for storing PDUs. The small internal memory is expensive but located on the same chip as the protocol processor and thus fast and tightly coupled to protocol processing. The large external memory is inexpensive and provides for sufficient storage capacity needed in cases of high PDU traffic volume. On the other hand, the external memory is accessible only via an external interface resulting in bandwidth limitations and low access speed compared to the internal memory.

Typically, segment memories are used as internal memory and as external memory. Segment memories are arranged in memory segments of a given size. Each segment is associated with a fixed segment address. Segment memories allow for efficient and versatile storage management, mainly because memory segments may be concatenated in lists and freely allocated to different applications.

SUMMARY

One embodiment provides a device for data packet processing is disclosed. In one embodiment, the device includes a processor implemented on a chip, an on-chip internal segment memory accessible by the processor, an off-chip external segment memory and a data transfer channel between the internal segment memory and the external segment memory. The external segment memory comprises first and second memory segments wherein the first and second memory segments are different in size.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts. Embodiments of the invention are made more evident in the following detailed description when read in conjunction with the attached figures, wherein.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
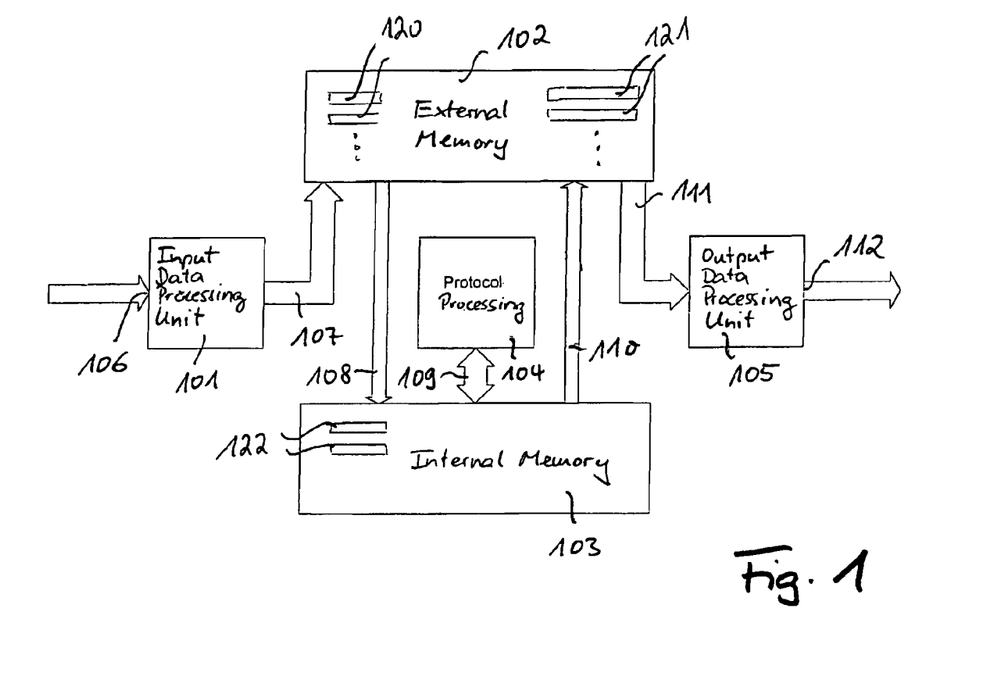
FIG. 1 is a block diagram of a system for data processing comprising a protocol processor cooperating with internal and external memories.

Embodiments of the invention as more specifically detailed in the following may be applicable to packet-switched data communication systems, networks and protocols, among the latter TCP (Transmission Control Protocol), IP (Internet Protocol) and Ethernet protocol. FIG. 1 illustrates a simplified block diagram of a system for data processing. The system includes an input data processing unit 101, an external memory 102, an internal memory 103, a protocol processor 104 and an output data processing unit 105. Incoming PDUs arrive at an input 106 of the input data processing unit 101. It may not be predictable when PDUs arrive, how many PDUs arrive and in which order they arrive. Further, typically the length of the PDUs are variable and can often not be predicted or prediction may be imprecise.

The input data processing unit 101 converts the data format used by the PDUs into an internal data format which is used for storage and protocol processing purposes. Data formatted in this internal data format is then stored via data connection 107 in the external memory 102. That part of the PDU, which is necessary for protocol processing, is then transferred via data connection 108 into the internal memory 103. The protocol processor 104 accesses the internal memory 103 via bidirectional data connection 109. As will be described later in more detail, during protocol processing, the data stored in the internal memory 103 is changed. Then, the changed data is returned via data connection 110 to the external memory 102 and may be stored at the same memory location from which it was obtained. Eventually, the PDU-data structured in the internal data format and containing the data part changed during the protocol processing is forwarded via data connection 111 to the output data processing unit 105. The output data processing unit 105 performs an operation that is inverse to the operation of the input data processing unit 101, i.e. retransforms the incoming data structured according to the internal data format into the data format used by the PDUs. These PDUs are then output at an output 112 of the output data processing unit 105.

It is to be noted that the external memory 102 is off-chip, i.e. implemented on another chip than the internal memory 103 and the protocol processor 104. Thus, data transferred via data connections 108 and 110 passes an interface (not illustrated in FIG. 1) designed for external devices. In contrast thereto, the protocol processor 104 and the internal memory 103 are coupled via an internal interface (not illustrated in FIG. 1). The input data processing unit 101 and the output data processing unit 105 are usually implemented on the same chip as the internal memory 103 and the protocol processor 104. Thus, also data connections 107 and 111 use an interface for external devices.

According to one aspect, the external memory 102 has memory segments of at least two different lengths, namely first memory segments 120, which are small in length, and second memory segments 121, which are longer than the first memory segment 120 in length. The internal memory 103 is also a segment memory. However, the internal memory 103 may only include memory segments 122 of the same length. Typically, the length of the memory segments 122 in the internal memory 103 is the same as or similar to the length of the first memory segments 120 in the external memory 102. Thus, the protocol processing performed by the protocol processor 104 only operates on memory segments 122 with fixed length.

Figure 2:
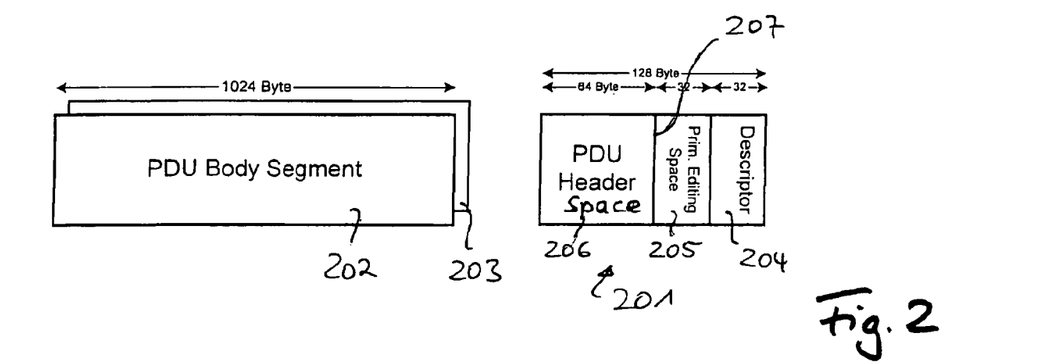
FIG. 2 is a diagram illustrating an internal data structure used in the system of FIG. 1.

FIG. 2 illustrates an example for an internal data format generated by the input data processing unit 101. The internal data format comprises two different data segments with different segment lengths. A PDU arriving at the input 106 of the input data processing unit 101 is mapped on a first data segment 201 with a first segment length and, if not all data of the PDU fits in the first data segment 201, on one or more second data segments 202, 203 of a second segment length. The first data segment 201 is subdivided in three sub-segments, namely a descriptor 204, a primary editing space 205 and a PDU header space 206. The second data segment(s) 202, 203 may be continuous, i.e. without internal data structure.

The descriptor 204 may have a predetermined length. The boundary 207 between the primary editing space 205 and the PDU header space 206 may be variable. The location of the boundary 207 relative to the beginning of the first data segment (i.e. the first bit of the descriptor 204) may be indicated in the descriptor.

As an example, the descriptor 204 may have a predetermined length of 32 byte and the initial length of the primary editing space 205 may also be 32 byte. The input data processing unit 101 receives a PDU consisting of a PDU header and a PDU body. The boundary 207 is the starting point for mapping the PDU data into the first and second data segments 201, 202, 203. As the PDU header represents the leading data of the PDU, depending on the length of the PDU header space 206, three cases may occur in operation. First, the full PDU header and some or all following PDU body data is copied into the PDU header space 206. A second possibility is that the PDU header space 206 has exactly the length of the PDU header. In this case, the PDU header is also fully copied into the PDU header space 206 and completely fills this PDU header space 206. A third possibility is that the PDU header has a greater length than the PDU header space 206. In this case, starting from the boundary 207, only a leading part of the PDU header is copied into the PDU header space 206 of the internal data format.

In all three cases, PDU data which does not fit into the first data segment 201 is seamlessly copied into the second segments 202, 203 etc. In other words, regardless of which case is considered (PDU header space 206 greater, equal or smaller in length than the PDU header) the first PDU bit which fails to fit into the first data segment 201 is the leading bit in the second data segment 202. If a second or more second data segments 203 are required, the alignment between subsequent second data segments 202, 203 is also seamlessly.

If the external memory 102 is a segment memory having memory segments 120, 121 of different lengths, the first data segment 201 is transferred into the first memory segment 120 and the second data segments 202, 203, if any, are stored into the second memory segments 121. It is to be noted that the size of the first memory segments 120 may be identical to the length of the first data segments 201 and the size of the second memory segments 121 may be identical to the length of the second data segments 202, 203. However, the memory segment sizes can also be larger or smaller than the corresponding data segment length, respectively.

In embodiments, only the first data segment 201 is subjected to protocol processing. Thus, first data segments 201 are transferred from the first memory segments 120 in the external memory 102 to the memory segments 122 in the internal memory 103 via the data connection 108. In one embodiment, the length of the first data segment 201 is equal or an integer multiple of the size of a segment 122 in the internal memory 103. In this case, copying of the first memory segment 120 from the external memory 102 into the internal memory 103 does not result in any cut-off or waste.

During protocol processing, the first data segment 201 is accessed by the protocol processor 104 via internal data connection 109. The boundary 207 is the starting point for protocol processing. This starting point is known from the descriptor 204. During protocol processing, PDU header data is modified.

According to the OSI (Open System Interconnection) reference model the relevance of protocol layers in the PDU header decreases in the direction to higher protocols, i.e. in the (left) direction towards the payload. Thus, modifications of the PDU header may start from the boundary 207 and propagate to the left. In other words, protocol data which is relevant for protocol processing is typically located at the beginning of the PDU header. Depending on the specifics of the protocol processing, it is only necessary to modify the PDU header up to a certain processing depth.

Many different types of PDU header processing may be provided in various embodiments.

It may be the case that the PDU header is not extended or reduced in length but only modified up to a certain depth relative to the boundary 207. In this case, the primary editing space 205 remains unused and the location of the boundary 207 must not be updated in the descriptor 204.

Basically, the PDU header length may increase or decrease during protocol processing. If PDU header data is added, new PDU header data is written into the primary editing space 205. Further, PDU header data in the (initial) PDU header space 206 may be modified but is not moved. Editing the primary editing space 205 with new PDU header data results in a displacement of the boundary 207 in the right direction. Thus, the descriptor 204 is updated in order to indicate the new boundary 207 location.

If the length of the PDU header decreases during protocol processing, PDU header data is canceled beginning from the boundary 207 in the left direction. Again, PDU header data may be modified but is not moved, and the location of the boundary 207 is updated in the descriptor 204.

To summarize, in the two last cases, i.e. when increasing the length of the PDU header data or when decreasing the length of the PDU header data, the existing PDU header data may be modified or may remain unmodified. Here, unmodified means that data is not replaced by other data, however, it may be deleted. Growth or contraction of PDU header data is accommodated by a relocation of the boundary 207. In all cases set out above, as PDU header data is not shifted, the connection between PDU header data and PDU body data (payload) remains stable.

After protocol processing, the modified first data segment 201 is copied from the internal memory 103 into the external memory 102. Each data segment 201 may be copied to the same memory location (first memory segment 120) from which it was read. In other embodiments, data segment 201 may be copied to other memory segments.

As data in the PDU header space 206 is not moved, the output data processing unit 105 may simply reassemble a PDU by linking the processed first data segment 201 to second data segments 202, 203, if any. Therefore, the output data processing unit 105 may transmit the reassembled data without any further processing beginning from the updated location of the boundary 207.

The length of the first data segment 201 (i.e. the data which is "visible" for protocol processing) may be chosen according to various criteria. A minimum length of the first data segment 201 is given by the length of the descriptor 204 plus the length of the primary editing space 205 plus the processing depth of the PDU header required for protocol processing in protocol processor 104. Thus, for the sake of minimum data transfer between the external memory 102 and the internal memory 103, the length of the first data segment 201 may be adapted to the processing depth of the protocol processing accomplished by the protocol processor 104.

In embodiments, the length of the first data segment 201 may be adapted to the predetermined size of the memory segment 122 in the internal segment memory and/or to the fixed size of the first memory segment 120 in the external segment memory. In this case, the length of the first data segment 201 is typically an integer power of two.

Still another possibility is to adapt the length of the first data segment 201 to a length distribution of incoming PDUs. As an example, it is known that the length distribution of IP PDUs in access networks may be approximated by characteristic curves. A simple known approximation is the so-called IMIX distribution. According to the IMIX distribution, seven PDUs out of twelve PDUs have smaller or equal size than 40 byte (58.3%), four PDUs out of twelve PDUs are larger in size than 40 byte but smaller in size than 1400 byte, whereby a characteristic accumulation of 33.3% shows up around 500 byte, and one PDU out of twelve PDUs has a size larger than 1400 byte (8.3%). Thus, the length of the PDU header space 206 (which defines the length of the first data segment 201 provided that the length of the descriptor 204 and the length of the editing space 205 are predetermined) may be chosen such that about 50% or more than 50% of the PDUs completely fit into the PDU header space 206. In this case, second data segments 202, 203 are only needed in 50% or less than 50% of PDUs arrivals, easing the operation expense for storage allocation in the external segment memory 102.

The length of the second data segments 202, 203 which mainly contain payload data may be adapted to the size of the second memory segments 121 in the external segment memory 102. For instance, the second data segments 202, 203 may have a length in the range from 128 to 2048 byte.

It is to be noted that the length of the first data segment 201 and the length of the second data segments 202, 203 may have values which are not an integer power of two. Such lengths may be used for a "tailor-made" length adjustment in view of optimization criteria. However, expenditure for storage allocation may arise when it is intended to prevent the occurrence of "holes" in the usable address space.

If the sum of the required processing depth and the required primary editing space 205 has a length not larger than 96 byte, a first data segment length of 128 byte may be advantageous. This length may be subdivided in fixed 32 byte for the descriptor 204, a PDU header space 206 between 64 and 96 byte and a corresponding primary editing space 205 between 0 and 32 byte, see FIG. 2. As already mentioned, the primary editing space 205 is located between the descriptor 204 and the beginning of the PDU header space 206 as determined by the input data processing unit 101. It is to be noted that the length of 32 byte for the primary editing space 205 is sufficient to accommodate common PDU header extensions experienced in practice.

With, e.g., a maximum PDU length of less than 2088 bytes (as is, for instance, stipulated in access networks on the basis of the Ethernet protocol), a length of the second data segments 202, 203 of 1024 bytes may be advantageous. In this case, a maximum of two second data segments 202, 203 are needed for storage of a PDU. The PDU data in the internal data format may then be described by only four addresses:

(1) the address of the first data segment 201 (e.g. 16 to 24 bits)
(2) the relative start address of the PDU header space in the first data segment 201, i.e. the location of the boundary 207 (e.g. 5 to 7 bits)
(3) the address of the second data segment 202, if any (e.g. 16 to 24 bits)
(4) the address of the second data segment 203, if any (e.g. 16 to 24 bits)

Addresses (2), (3) and (4) may be stored in the descriptor 204 of the first data segment 201. Therefore, no chain-linking of addresses is needed.

Returning to FIG. 1, it is to be noted that the external segment memory 102 can also be organized with more than two segment sizes. As an example, if three segment sizes are used, these segment sizes may be 128, 512 and 1024 bytes, respectively. The internal segment memory 103 may also have different memory segment sizes but is usually organized only with one memory segment size, because usually only first data segments 201 are stored in the internal segment memory 103.

It is to be noted that the provision of a multi-segment size external segment memory 102 as depicted in FIG. 1 and the provision of the internal data format as explained above in conjunction with FIG. 2 need not necessarily be combined. A system for data processing using an external segment memory 102 with multiple segment sizes may use another internal data format as of the type explained above. Vice versa, the internal data format as explained above in conjunction with FIG. 2 may be used in a conventional system for data processing equipped with an external segment memory 102 comprising only memory segments of uniform size.

Figure 3:
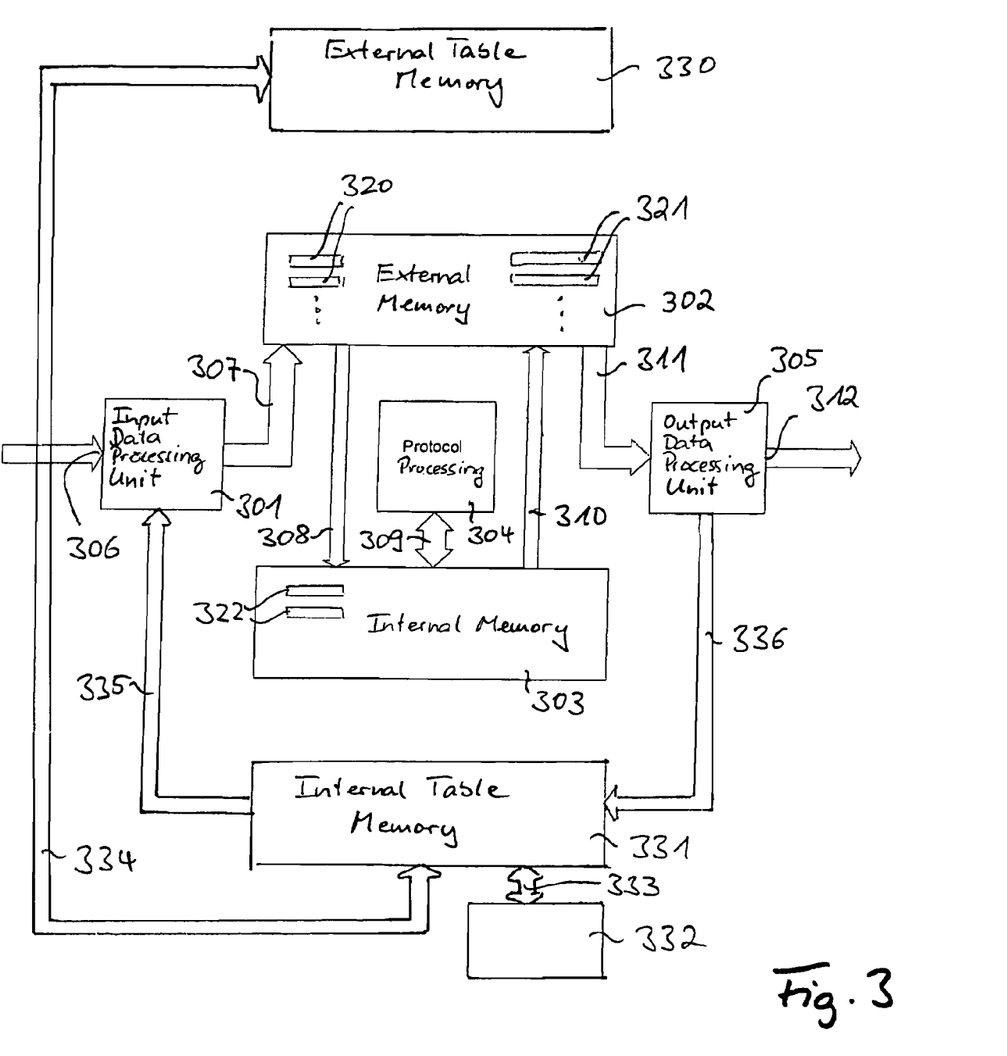
FIG. 3 is a block diagram of a system for data processing comprising a protocol processor cooperating with internal and external memories and a memory segment allocation management arrangement.

FIG. 3 illustrates a simplified block diagram of a system for data processing similar to the system for data processing as depicted in FIG. 1. Thus, reference signs 301 to 312 relate to the same units as denoted in FIG. 1 with reference signs 101 to 112, respectively. First memory segments 320 and second memory segments 321 of the external segment memory 302 relate to first memory segments 120 and second memory segments 121, respectively, as shown in FIG. 1. Likewise, memory segments 322 of the internal segment memory 303 correspond to memory segment 122 as illustrated in FIG. 1.

According to another aspect of the invention, memory segment allocation management of the external segment memory 302 is provided. The memory segment allocation management arrangement illustrated in FIG. 3 includes an external ("off-chip") table memory 330, an internal ("on-chip") table memory 331 and a pointer exchange unit 332 coupled to the internal table memory 331 via a bidirectional data connection 333. Internal table memory 331 and external table memory 332 are coupled to each other by a bidirectional data connection 334. The input data processing unit 301 and the output data processing unit 305 are both coupled via data connections 335 and 336, respectively, to the internal table memory 331.

First, it is assumed that the external segment memory 302 is a segment memory having only memory segments of uniform size. In other words, first and second memory segments 320, 321 are identical.

When the input data processing circuit 301 has structured an incoming PDU into one or more data segments according to the internal data format, these data segments may be quickly stored in the external segment memory 302. On the other hand, when the output data processing unit 305 has received the required data segments 201, 202, 203 from the external segment memory 302 for reassembling a PDU, the memory segments 320, 321 from which the data segments 201, 202, 203 were obtained may be quickly provided for the input data processing unit 301 as free (i.e. unoccupied) memory segments ready for re-use. In order to address the above, a storage management according to an exemplary embodiment is described below.

Figure 4:
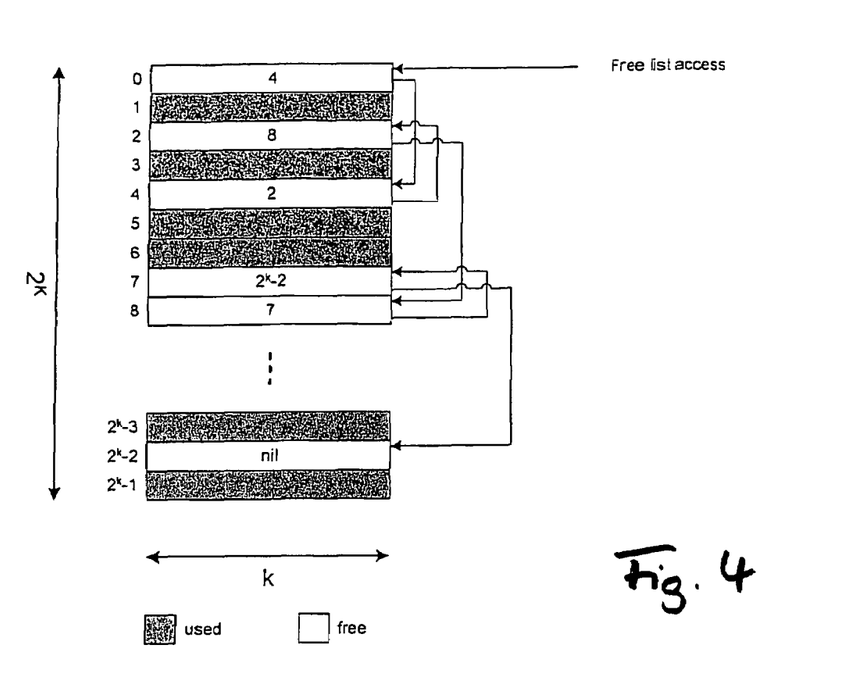
FIG. 4 is a diagram illustrating the structure of an external table memory used for storage management of an external segment memory.

Free memory segments 320, 321 of the external segment memory 302 are quoted in respective lists, which are stored and updated in external table memory 330 and internal table memory 331. FIG. 4 illustrates a list of all segment addresses of the memory segments 320, 321 in the external segment memory 302. This list is maintained and updated in the external table memory 330. $2^k$ is the number of memory segments in the external segment memory 302. Thus, each memory segment 320, 321 may be addressed by a segment address having k bits. Consequently, the size of the external table memory 330 may be at least $2^k \times k$ bits. In FIG. 4, the segment addresses are denoted by 0, 1, 2, . . . , $2^k-2$, $2^k-1$. To each of these segment addresses, the external table memory 330 provides a memory space of k bits. If a segment address is associated with a memory segment 320, 321 which is used, the corresponding k bit memory space in the external table memory 330 has no entry, see shaded memory spaces associated with the memory segments with addresses 1, 3, 5, 6, . . . , $2^k-3$, $2^k-1$. Otherwise, if the memory segment 320, 321 associated with the segment address is free, the corresponding memory space stores the segment address of the next free memory segment 320, 321. According to FIG. 4, the memory segments 320, 321 associated with the segment addresses 0, 2, 4, 7, 8, . . . , $2^k-2$ are free memory segments 320, 321. The memory space associated with the segment address 0 stores segment address 4, which is the segment address of the next free memory segment 320, 321. The memory space associated with the segment address 4 stores the segment address 2, i.e. points to the next free memory segment 320, 321 addressed by the segment address 2, etc. It is apparent from the above that the external table memory 330 maintains an ordered list of segment addresses associated with the free memory segments 320, 321 of the external segment memory 302. The ordered list of segment addresses reads 0, 4, 2, 8, 7, $2^k-2$. The order of the segment addresses represents an order over time, indicating the sequence in which memory segments 320, 321 become free (or, as will be explained later, will be transferred as addresses of released memory segments from the internal table memory 331 to the external table memory 330).

Figure 5:
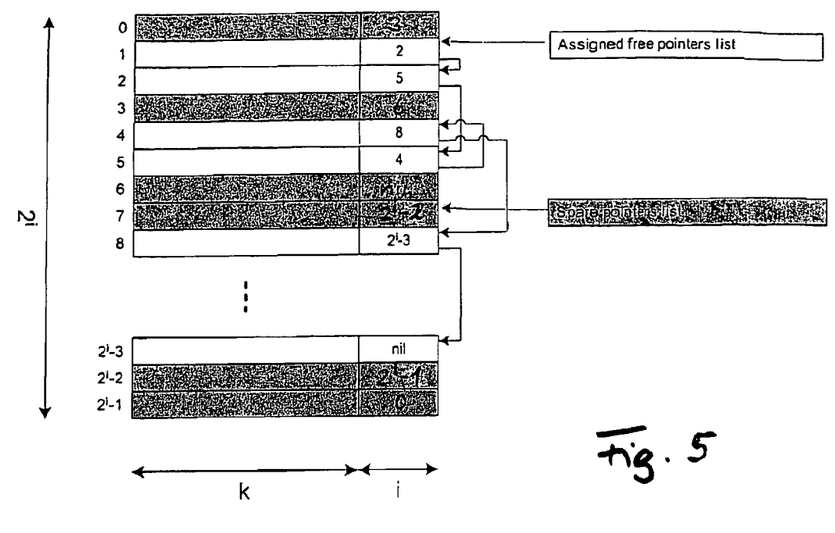
FIG. 5 is a diagram illustrating the structure of an internal table memory used for storage management of an external segment memory.

As the external table memory 330 is off-chip, memory accesses between the input data processing unit 301 or the output data processing unit 305 and the external table memory 330 would be comparatively slow. On the other hand, due to the considerable size of at least $2^k \times k$ bits of the external table memory 330, it would be in many cases impracticable to implement such table memory as a "fast" internal table memory. Therefore, according to FIG. 4, a second, smaller size table memory 331 for segment address management is used which is an internal (i.e. on-chip) memory. FIG. 5 illustrates the organization of this internal table memory 331.

Similar to the external table memory 330, the internal table memory 331 lists segment addresses associated with free memory segments of the external segment memory 302. According to embodiments, only a subset of segment addresses associated with free memory segments is stored in the internal table memory 331. More specifically, the internal table memory 331 may have a memory size adapted to store $2^i$ segment addresses, where i<k. In FIG. 5, the numbers 0, 1, 2, . . . , $2^i-2$, $2^i-1$ index these i memory spaces. Each memory space has a first subspace of size k, in which a segment address associated with a memory segment 320, 321 of the external segment memory 302 may be stored. Further, each memory space has a second subspace of size i, in which an address of the internal table memory 331 may be stored. This second subspace of size i allows to order the segment addresses associated with free memory segments 320, 321. Referring to the example illustrated in FIG. 5, the segment addresses associated with free memory segments 320, 321 are stored under addresses 1, 2, 4, 5, 8, . . . , $2^i-3$ of the internal table memory 331. Similar to FIG. 5, unshaded memory spaces relate to free memory segments 320, 321. The order of segment addresses (associated with free memory segments 320, 321 of the external segment memory 302) is 1, 2, 5, 4, 8, $2^i-3$. In FIG. 5, this list is denoted as "assigned free pointers list".

In FIG. 5, shaded memory spaces are spare memory area. Spare memory area may also be maintained in a list. This is indicated in FIG. 5, where the second subspace of each spare memory space contains an address of the internal table memory 331 pointing to the next spare memory space. In the example depicted in FIG. 5, the spare address list (termed "spare pointers list" in FIG. 5) reads 7, $2^i-2$, $2^i-1$, 0, 3, 6.

As an example, if the internal table memory 331 has 4 K entries (i.e. memory spaces), then i=12. An external segment memory 302 of 1 M segments uses addresses with k=20 bits. Thus, the word length of the internal table memory 331 may then be k+i=20+12=32 bits. This word length is in accordance with the word length both of the most common protocol processors 304 and the most common interfaces for external devices.

An exemplary operation of the memory segment allocation management is described in the following. When the output data processing unit 305 reads out segment data from the external segment memory 302, it informs the internal table memory 331 via data connection 336 about the segment addresses of the memory segments 320, 321 which became free. On the other hand, when the input data processing unit 301 needs to store generated data segments 201, 202, 203 in memory segments 320, 321 of the external segment memory 302, free memory segment addresses may be rapidly obtained via data connection 335. As the internal table memory 330, the input data processing unit 301 and the output data processing unit 305 are all implemented on the same chip, rapid transfer of segment addresses between these units is possible.

In other words, the internal table memory 331 is operative to maintain a limited stock or supply of segment addresses associated with free memory segments 320, 321 in order to accelerate the storage memory segment allocation management of the external memory 302. Address requests and releases of addresses are directed primarily to the internal table memory 331, as long as the list of free segment addresses maintained in the internal table memory 331 is not depleted. If address request and address releases are largely balanced, the internal table memory 331 may satisfy the needs of providing and taking back segment addresses over long time periods. The number of memory accesses to the external table memory 300 is significantly reduced which may be similar to a cache effect. It is to be noted that optional data connections between the external table memory 330 and the input/output data processing units 301, 305 are not shown in FIG. 3. However, as the amount of incoming and outgoing PDUs may considerably vary over time, it may be the case that a high number of segment address requests from the input data processing unit 301 may deplete the internal table memory 331. Conversely, a high number of releases of segment addresses by the output data processing unit 305 may result in an overflow of the internal table memory 331. In order to prevent such underflow or overflow condition of the internal table memory 331, the internal table memory 331 may exchange free segment addresses (also termed as pointers) with the external table memory 330 via bidirectional data connection 334.

More specifically, in the first case also denoted as underflow-transfer, segment addresses associated with free memory segments 320 321 are extracted from the list maintained in the external table memory 330 (FIG. 4), transferred to the internal table memory 331 and added to the list of segment addresses displayed in FIG. 5. When a segment address is extracted from the list maintained in the external table memory 330, this segment address will already be recorded in the segment address list maintained in the external table memory 330 as a used segment address although it is not effectively used until this segment address is handed over from the internal table memory 331 to the input data processing unit 301. Therefore, an address of a free segment 320, 321 will either be held in internal table memory 331 or in external table memory 330 but not in both table memories 331, 330. Consequently, the external table memory 330 may be viewed as a reservoir of additional addresses of free memory segments 320, 321 which are not contained in the list held in the internal table memory 331.

In the second case, also denoted as overflow-transfer, segment addresses are extracted from the address list maintained in the internal table memory 331, transferred via bidirectional data connection 334 to the external table memory 330 and added to the list of segment addresses associated with free memory segments in the external table memory 330. This prevents overflow of the internal table memory 303 in case of high activity of the output data processing unit 305 and low activity of the input data processing unit 301.

If two lists (free address list and spare address list) are held in the internal table memory 331 in accordance with FIG. 5, an exemplary operation of the memory segment allocation management may be as follows: At the beginning, the spare address list covers all memory spaces. The following transitions may be defined:

When a free address (i.e. an address of a free memory segment) of the external memory 302 is allocated for storage of a PDU, an entry from the free address list is removed and added to the spare address list.

When a PDU address in the external memory 302 is released, an entry from the spare-address list is removed, the PDU address is written into this entry and the entry is added to the free address list.

When a free address is transferred from the external table memory 330 to the internal table memory 331, an entry from the spare address list is removed, the free address is written into this entry and the entry is added to the free address list (underflow-transfer operation).

When an address is transferred from the free address list in the internal table memory 331 to the external table memory 330, this address is removed from the free address list and is added to the spare address list in the internal table memory 331 (overflow-transfer operation).

The pointer exchange unit 332 may be used to control the underflow-transfer and/or the overflow-transfer of addresses. To this end, the pointer exchange unit 332 may monitor the fill level of the internal table memory 331 via bidirectional data connection 333, as illustrated at S1 of FIG. 6.

Figure 6:
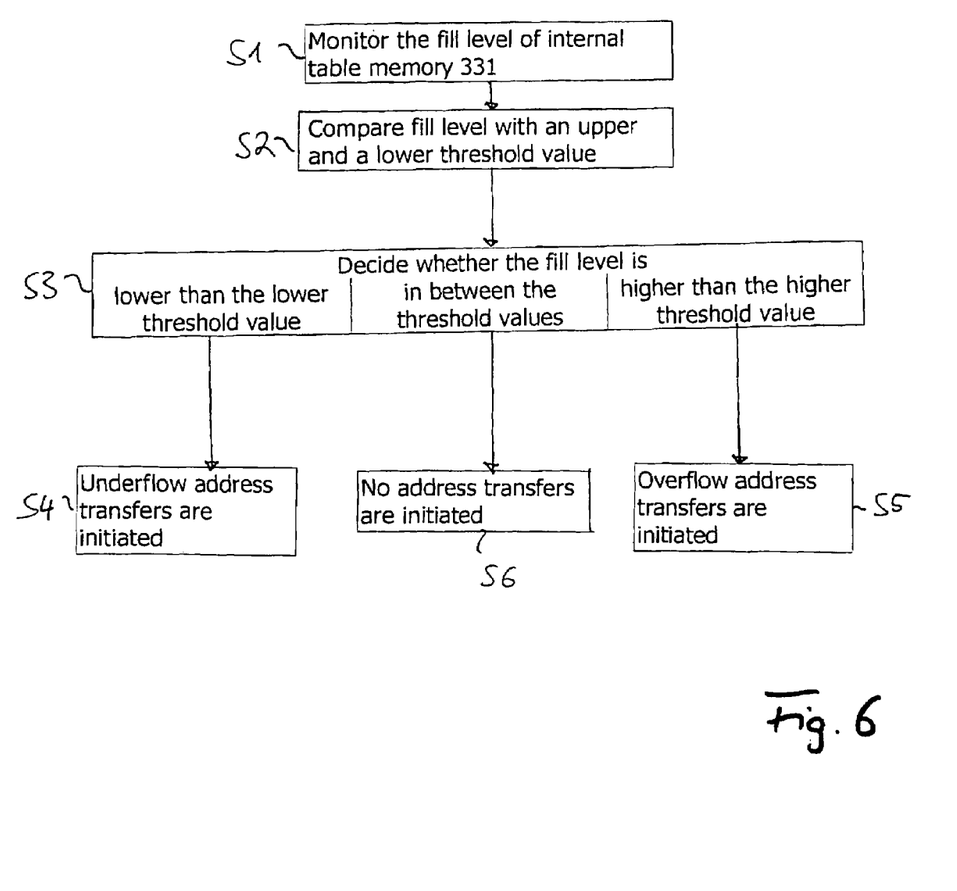
FIG. 6 is a flowchart illustrating a process for memory segment allocation.

At S2, the fill level may be compared to e.g. two threshold values, i.e. an upper threshold value and a lower threshold value.

At S3 it is decided whether the fill level is lower than the lower threshold value, higher than the upper threshold value or in between of the lower and upper threshold values. If the fill level is lower than the lower threshold value, a number of successive underflow-transfer operations is initiated (at S4). Conversely, if the fill level is higher than the upper threshold value, a number of successive overflow-transfer operations is initiated (at S5). If the fill level is in between of the lower and upper threshold values, no address transfer is needed (at S6).

The process described above may be refined by implementing a hysteresis in underflow-transfer operation and/or in overflow-transfer operation. In hysteresis underflow-transfer operation a lower underflow threshold value and an upper underflow threshold value are provided. Underflow address transfers are initiated if the fill level falls below the lower underflow threshold value and is stopped when the fill level exceed the upper underflow threshold value. Conversely, in hysteresis overflow address transfer operation, a lower overflow threshold value and an upper overflow threshold value are provided. Overflow address transfers are initiated when the fill level exceeds the upper overflow threshold value, and the overflow address transfers are stopped when the fill level falls below the lower overflow threshold value.

By an appropriate choice of the lower and upper underflow and overflow threshold values, it is possible to minimize the number of address transfers or to find an optimum setting in view of different PDU load distributions.

In the following, it is assumed that the external segment memory 302 comprises two types of memory segments 120, 121 having different segment sizes. A detailed description of the external segment memory 302 has been provided above and will not be described here. Reference is made to the above explanations.

Figure 7:
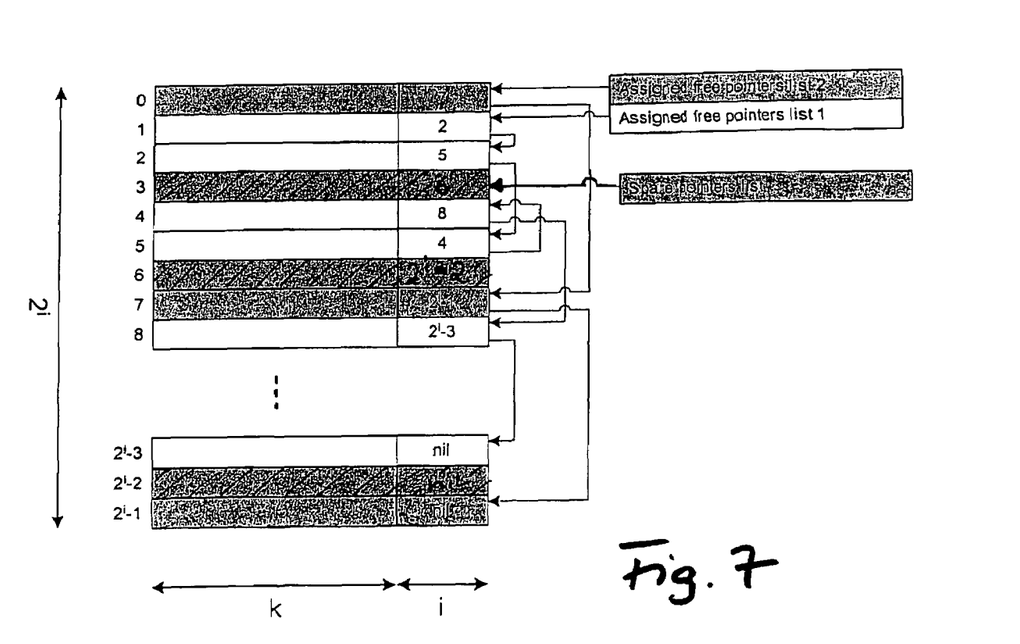
FIG. 7 is a diagram illustrating the structure of an internal table memory used for storage management of two external segment memories.

FIG. 7 illustrates the organization of the internal table memory 331 when two memory segment sizes are considered. Again, as already illustrated in FIG. 5, the internal table memory 331 has a limited number of $2^i$ memory spaces comprising a first memory subspace of word length k (e.g. k=20) and a second memory subspace of word length i (e.g. i=12). However, as the external table memory 330 comprises two types of memory segments 320, 321, two segment free address lists are handled in the internal table memory 331. A first free list denoted as assigned free pointers list 1 in FIG. 7 recites free addresses of first memory segments 320 destined to store first data segments 201 produced by the input data processing unit 301. A second list denoted as assigned free pointers list 2 in FIG. 7 recites free addresses of second memory segments 321 destined to store second data segments 202, 203 produced by the input data process unit 301. It is to be noted that the sum of the lengths of both lists can not be greater than $2^i$, because both lists are maintained in the same internal table memory 331. Rather than using a fixed partition of the internal table memory 331 for maintaining the two lists in physically separate memory areas, both lists may be spread over the whole memory space and each memory space may be used (however, not simultaneously) by both lists.

Referring to FIG. 7, assigned free pointers list 1 reads 1, 2, 5, 4, 8, $2^i$–3. Assigned free pointers list 2 reads 0, 7, $2^i$–1. In case of assigned free pointers list 1, the first memory subspaces store memory addresses of first memory segments 320. In case of assigned free pointers list 2, the first memory subspaces store memory addresses of second memory segments 321. Note that segment addresses of first and second memory segments 320, 321 may have different word lengths.

Similar to FIG. 5, also in FIG. 7 spare memory space may be handled in a spare memory address list. In FIG. 7, this third list is termed spare pointers list. The spare memory address list comprises entries in the internal table memory 331 which do not contain addresses from free first or second memory segments 320, 321 in the external memory 302, i.e. residual addresses, which are not contained in assigned free pointers list 1 or assigned free pointers list 2. In FIG. 7, the spare memory address list reads 3, 6, $2^i$–2.

At the beginning, the spare memory address list covers the entire memory space in the internal table memory 331. The operation of the memory segment allocation management may contain the following eight transitions:

When a free address associated to a first memory segment 320 is allocated for storage of a first data segment, an entry from the free address list 1 is removed and added to the spare memory address list.

When a free address associated to a second memory segment 321 is allocated for storage of a second data segment, an entry from the free address list 2 is removed and added to the spare memory address list.

When a first memory segment 320 is released, an entry from the spare memory address list is removed, the memory segment address is written into this entry and the entry is added to the free address list 1.

When a second memory segment 321 is released, an entry from the spare memory address list is removed, the memory segment address is written into this entry and the entry is added to the free address list 2.

When an address associated with a free first memory segment 320 of the external memory 302 is transferred from the external table memory 330 into the internal table memory 331, an entry from the spare memory address list is removed, the free address is written into this entry and the entry is added to the free address list 1 (underflow-transfer operation).

When an address associated with a free second memory segment 321 of the external memory 302 is transferred from the external table memory 330 into the internal table memory 331, an entry from the spare memory address list is removed, the free address is written into this entry and the entry is added to the free address list 2 (underflow-transfer operation).

When an address from the free address list 1 is to be transferred into the external table memory 330, this address is removed from the free address list 1 and added to the spare memory address list (overflow-transfer operation).

When an address from the free address list 2 is to be transferred into the external table memory 330, this address is removed from the free address list 2 and added to the spare memory address list (overflow-transfer operation).

Figure 8:
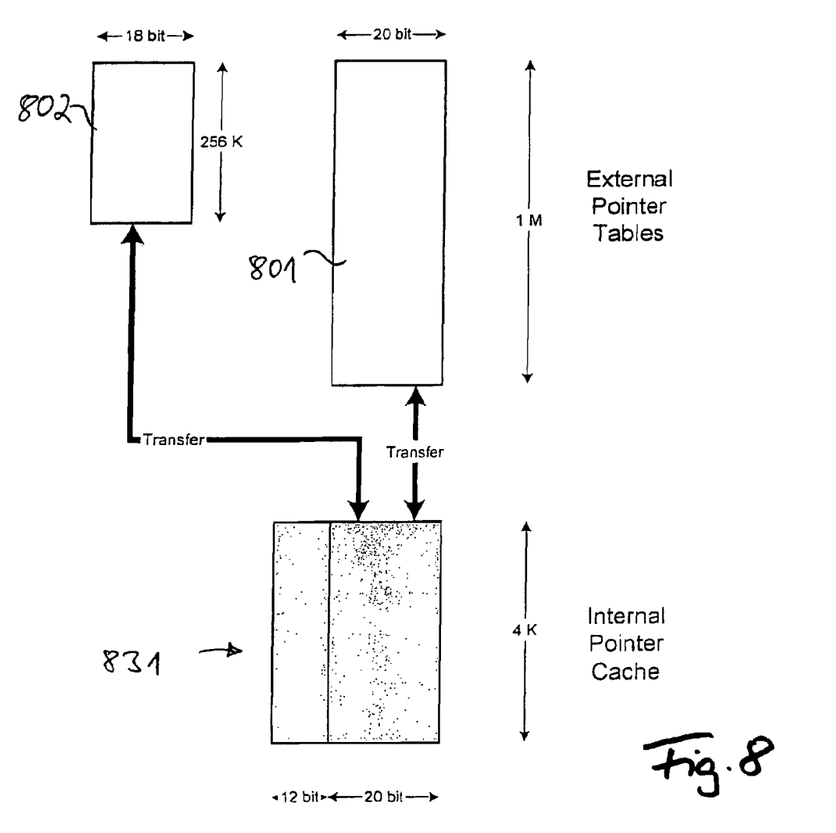
FIG. 8 is a block diagram illustrating address transfers between two external table memories and an internal table memory.

Thus, segment address transfers between the internal table memory 331 and external table memory 330 may be accomplished similar as explained above for the case of an external segment memory 302 comprising only one and the same segment type 320, 321. More specifically, as displayed in FIG. 8, the external table memory 330 may include two separate memory areas 801, 802. The first memory area 801 is used to store a complete list of addresses associated with free first memory segments 320. The second memory area 802 is used to store a complete list of addresses associated with free second memory segments 321. As an example, if the external segment memory 302 contains 1 M first memory segments 320, the size of the first memory area 801 may be 20 bits×1 M. If the external segment memory 302 contains 256 K second memory segments 321, the size of the second memory area 802 may be 18 bits×256 K.

Transfer of free segment addresses (pointers) is accomplished between the internal table memory 831 (corresponding to internal table memory 331 as shown in FIG. 3) and the first memory area 801 as well as the second memory area 802 of the external table memory 330. The internal table memory 831 is organized according to FIG. 7 and thus maintains free address list 1 (i.e. assigned free pointers list 1), free address list 2 (i.e. assigned free pointers list 2) and optionally spare memory address list (i.e. spare pointers list). Pointer transfer management may be accomplished as aforementioned with reference to a single memory segment size external segment memory 302, cf. the description in conjunction with FIGS. 3 to 6. In particular, as already mentioned, each pointer transfer (i.e. pointer transfer between memory area 801 and internal table memory 831 and pointer transfer between memory area 802 and internal table memory 831) may be managed by using the technique of hysteresis underflow and hysteresis overflow free address exchange. In this case, as already described above, a lower threshold value and an upper threshold value are chosen for address transfers of free first memory segments and a lower threshold value and an upper threshold value are chosen for address transfers of free second memory segments.

The choice of these threshold values should be made dependent on the need of first memory segments 320 and second memory segments 321 by the input data processing unit 301. As an example, if the IMIX-distribution of PDU lengths is considered, an average amount of 12 addresses are needed for addresses of first memory segments 320 and an average amount of 7+2=9 addresses is needed for addresses of second memory segments 321. The length of free address list 1 may be appropriately adapted to the length of free address list 2 by choosing appropriate lower and upper threshold values for the two free address transfer mechanisms.

According to embodiments, predetermined, fixed upper and lower threshold values may be used. However, an extended approach for memory segment allocation may envisage to vary the values of the upper and/or lower threshold values depending on various parameters. For instance, the actual need for first memory segments 320 and second memory segments 321 may be taken into account. The actual need of first memory segments 320 and second memory segments 321 may be measured by counting the number of allocated first memory segments 320 and allocated second memory segments 321 over a sliding time window, for instance.

From the foregoing, it is to be noted that the free address transfer process is a background process which is rather loosely than directly coupled to the memory segment allocation processes accomplished by the input data processing unit 301 and the output data processing unit 305. The loose coupling is caused by the mechanism of fill level dependent free address transfers as explained above. While the above embodiments have been described with respect to a table list structure, it may also be possible to provide other structures, for example a ring structure.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A device comprising:
   a processor implemented on a chip;
   an on-chip internal segment memory accessible by the protocol processor;
   an off-chip external segment memory;
   a data transfer channel between the internal segment memory and the external segment memory;
   an off-chip external table memory configured for segment allocation management of the external segment memory;
   an on-chip internal table memory configured for segment allocation management of the external segment memory;
   an address transfer channel between the external table memory and the internal table memory;
   an address transfer management unit operative to transfer segment addresses of memory segments of the external segment memory from the external table memory into the internal table memory and/or to transfer segment addresses of memory segments of the external segment memory from the internal table memory into the external table memory;
   an input data processing unit for mapping incoming PDUs into an internal data format comprising a first data segment and a second data segment; and
   an output data processing unit for reassembling first and second data segments of the internal data format into PDUs to be output;
   wherein the address transfer management unit is configured to:
      monitor the fill level of the internal table memory; and
      to initiate a transfer of one or more addresses from the external table memory to the internal table memory if the fill level is lower than a lower threshold value and/or
      to initiate a transfer of one or more addresses from the internal table memory to the external table memory if the fill level is higher than an upper threshold value, wherein the upper threshold value is greater than the lower threshold value.

2. The device according to claim 1, wherein the processor is a protocol processor.

3. The device according to claim 1, wherein the internal table memory comprises a list of free memory segments of the external segment memory.

4. The device according to claim 3, wherein the external table memory comprises a list of additional free memory segments of the external segment memory which are not contained in the list hold in the internal table memory.

5. The device according to claim 3, wherein the internal table memory comprises a number of first storage units for storing addresses of the external segment memory, the number of first storage units being smaller than the number of segments of the external segment memory.

6. The device according to claim 5, wherein the internal table memory further comprises a number of second storage units for storing addresses of the internal table memory, wherein each second storage unit is associated with a first storage unit.

7. The device according to claim 5, wherein the external segment memory comprises $2^k$ segments and the internal table memory comprises $2^i$ first storage units, with i<k.

8. The device according to claim 1, wherein the external segment memory comprises first and second memory segments, the first and second memory segments are different in size.

9. The device according to claim 8, wherein the on-chip internal table memory is configured for segment allocation of the first and second memory segments of the external segment memory.

10. The device according to claim 9, wherein the address transfer management unit is configured
    to monitor a first fill level of the internal table memory in respect of first memory segments and a second fill level of the internal table memory in respect of second memory segments and
    to initiate a transfer of one or more addresses of first or second memory segments from the external table memory to the internal table memory if the first or second fill level is lower than a lower threshold value, respectively, and/or
    to initiate a transfer of one or more addresses of first or second memory segments from the internal table memory to the external table memory if the first or second fill level is higher than an upper threshold value, respectively, wherein the upper threshold value is greater than the lower threshold value, respectively.

11. A method for storing PDU data intended for protocol processing by a protocol processor implemented on a chip, comprising:
    mapping incoming PDU data into an internal data format comprising data segments;
    allocating memory segments in an off-chip external memory for storing the data segments by accessing a list recording addresses of free memory segments of the external segment memory, the list is maintained in an on-chip internal table memory, wherein an off-chip external table memory comprises a list of additional free memory segments of the external segment memory which are not contained in the list held in the internal table memory;

monitoring a fill level of the internal table memory and initiating a transfer of one or more addresses from the external table memory to the internal table memory if the fill level is lower than a lower threshold value; and/or initiating a transfer of one or more addresses from the internal table memory to the external table memory if the fill level is higher than an upper threshold value, wherein the upper threshold value is greater than the lower threshold value.

12. The method according to claim 11, further comprising:

mapping incoming PDU data into an internal data format comprising a first data segment and a second data segment; and allocating first and second memory segments of different sizes in the external segment memory for storing the first and second data segments by accessing a first list recording addresses of free first memory segments of the external segment memory and by accessing a second list recording addresses of free second memory segments of the external segment memory.

13. The method according to claim 12, wherein the first list and the second list are commonly held in the internal table memory.

14. The method according to claim 12, wherein monitoring a first fill level of the internal table memory in respect of first memory segments and a second fill level of the internal table memory in respect of second memory segments, and initiating a transfer of one or more addresses of first or second segments from the external table memory to the internal table memory if the first or second fill level is lower than a lower threshold value, respectively, and/or initiating a transfer of one or more addresses of first or second segments from the internal table memory to the external table memory if the first or second fill level is higher than an upper threshold value, respectively, wherein the upper threshold values are greater than the lower threshold values, respectively.

15. A data packet processing device, comprising:

a protocol processor implemented on a chip;

an on-chip internal segment memory accessible by the processor;

an off-chip external segment memory not directly accessible by the processor;

an input data processing unit coupled to said off-chip external memory configured to map an incoming PDU into an internal data format comprising a first data segment to be subjected to protocol processing and one or more second data segments not to be subjected to protocol processing; and a data transfer channel between the internal segment memory and the external segment memory;

wherein the external segment memory comprises first and second memory segments, the first and second memory segments being different in size;

wherein the data transfer channel is configured to transfer data stored in the first memory segments of the external segment memory to the internal segment memory whereby data stored in the second memory segments is not transferred through the data transfer channel to the internal segment memory;

wherein the protocol processor is configured to process the first data segment from internal memory and return through the data transfer channel the processed first data segment to the external segment memory; and an output data processing unit configured to reassemble the PDU from processed first data segment and unprocessed segment data segment and transform internal data format into the data format used by the PDU.

16. A method for data processing, comprising:

mapping incoming PDU data into an internal data format comprising a first data segment to be subjected to protocol processing and one or more second data segments not to be subjected to protocol processing;

storing first and second data segments in an off-chip external segment memory not directly accessible by a protocol processor, wherein the external segment memory comprises first and second memory segments, the first and second memory segments being different in size;

transferring the first data segment from off-chip external segment memory through a data transfer channel to an on-chip internal segment memory accessible by the protocol processor, whereby data stored in the second memory segments is not transferred thorugh the data transfer channel to the on-chip internal segment memory;

processing the first data segment from internal memory by the protocol processor;

returning through the data transfer channel the processed first data segment to the external segment memory;

reassembling the PDU from processed first data segment and unprocessed second data segments; and transforming internal data format into the data format used by the PDU.

* * * * *